Patented May 26, 1936

2,041,697

UNITED STATES PATENT OFFICE 2,041,697

AZO DYES AND METHOD FOR THEIR PREPARATION

Samuel Coffey, Crossland Moor, Huddersfield, Morvan Lapworth, Stockport, and Wilfred Archibald Sexton, Gledholt, Huddersfield, England, assignors to Imperial Chemical Industries Limited, a corporation of Great Britain No Drawing. Application November 27, 1933, Serial No. 700,016. In Great Britain November 30, 1932

16 Claims. (Cl. 8—5)

This invention relates to new azo dyes and more particularly refers to azo dyes which may be lactamized and rendered insoluble by treatment with dilute mineral acids.

It is an object of this invention to produce new azo dyes which are fast to washing and which are well adapted to commercial use. A further object is to produce azo dyes which may be made insoluble by lactamization, preferably with dilute mineral acids. A still further object is to produce dyes containing the carboxyl group on the diazo component, and in which this carboxyl group may be eliminated by treatment with acids. Additional objects will appear hereinafter.

These objects are attained according to the present invention which in its preferred form comprises coupling a compound free from water-solubilizing groups, preferably an ice color coupling component such as an arylamide of 2-3-hydroxynaphthoic acid, with a diazotized amine having the following general formula:

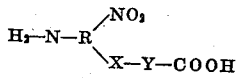

wherein R represents an aromatic nucleus free from water-solubilizing groups, such as carboxy or sulfo groups, X represents sulfur, oxygen, or the imine group —NH—, and Y represents a methylene radical of the series —CH$_2$—, —CH—alkyl— and —C—(alkyl)$_2$—, the group X—Y—COOH being substituted on the aromatic nucleus R in ortho position to the nitro group. The resulting azo compound is then treated in the customary manner, for instance with sodium sulfide, in order to reduce the nitro group to an amino group.

In British Patent 377,739 processes are described for producing new azo dyes by coupling diazotized or tetrazotized aromatic mono- or diamino compounds with an ortho-amino-aryl-thioglycollic acid The process of the present invention differs therefrom in that it enables the preparation of a new series of compounds, differing from the compounds of said British patent in this respect, that the lactamizable group is contained in the diazo part of the molecule as opposed to the coupling component. As a consequence, a wide field of practically valuable coupling components becomes available for the preparation of this type of dyestuff. As an illustration of the advantages thus obtained may be mentioned our surprising observation that if an ice color coupling component such as an arylamide of 2-3-hydroxynaphthoic acid, is selected the resulting compound is superior in many respects to those described in the aforementioned patent.

We have further found that the improvements derivable from British Patent 377,739 are not limited to the employment of an ortho-amino-aryl-thioglycollic acid, that is, a compound of the general formula

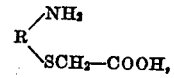

but may be obtained by the use of other compounds which possess substituents adapted to form an azine ring by lactamization. Accordingly, this invention contemplates further the preparation of azo dyestuffs which possess in either the diazo component or the coupling component the group —NH$_2$ and the group —X—Y—COOH, wherein X stands for —O— or —NH—, while Y stands for a radical of the series —CH$_2$—, —CH(alkyl)— and —C(alkyl)$_2$—, the two groups being located in ortho position to each other.

Where this pair of substituents occurs in the coupling component, the novel compounds thus produced differ from those disclosed in British Patent 377,739 in that upon lactamization they form an oxazine ring or a diazine ring instead of the thiazine. Where, however, the substituents are in the diazo part of the molecule, the compounds are novel even when X stands for sulfur and leads to a thiazine ring.

This invention may be more readily understood by a consideration of the following illustrative examples, in which the quantities are stated in parts by weight.

Example 1

11.4 parts of 2-nitro-4-amino-phenyl-thioglycolic acid were dissolved in 133 parts of 2% ice cold sodium carbonate solution. 3.45 parts of sodium nitrite were added, followed by 15.2 parts of 36% hydrochloric acid, i. e. until acid to Congo red paper. After half an hour, diazotization was complete and the cold diazo solution was run into a solution containing 14.65 parts of 2-3-hydroxy-naphthoic-p-anisidide in 12.5 parts of aqueous caustic soda 70° Tw. and 1000 parts water. After one hour's stirring the coupling was complete and the nitroazo compound was precipitated by the addition of 240 parts of salt. The nitroazo compound was filtered off and stirred with 400 parts of water at 50° C. 18 parts of sodium sulfide crystals were added and the mixture stirred at 50° for 2–4 hours. When reduction was complete, 60 parts of salt were added and the precipitated red dyestuff was filtered off. It may be kept as a paste or dried.

Instead of the 2-3-hydroxy-naphthoic-p-anisidide utilized in the above example, 13.15 parts of 2-3-hydroxy-naphthoic-anilide may be substituted. A red dyestuff is thereby obtained. Likewise, the substitution of 9.7 parts of aceto-acetic-p-anisidine for the aforementioned coupling component results in the production of a yellow dyestuff.

The following table describes representative compounds selected from the various classes coming within the scope of the present invention wherein diazotized 4-nitro-2-amino-phenyl-thioglycollic acid is treated according to the instructions given in the aforementioned example. The resulting nitroazo compound is reduced in the usual manner to give the corresponding aminoazo compound. Lactamization of these compounds on animal or vegetable fibers, including artificial fibers, according to well known methods, for instance treatment with hot dilute hydrochloric or sulfuric acid results in a remarkable increase in the fastness of these colors to mild alkaline washing.

| End component | Coupling medium | Color of final dyestuff on wool or silk |
|---|---|---|
| 2-3-hydroxy-naphthoic-5-chloro-o-toluidide. | Caustic soda | Red |
| Aceto-acetic-anilide | Caustic soda | Yellow |
| 2-hydroxy-carbazole-3-carboxylic-p-chloranilide. | Caustic soda | Brown |
| β-naphthol | Sodium acetate and acetic acid. | Red |
| 1-phenyl-3-methyl-5-pyrazolone | Sodium acetate and acetic acid. | Orange |
| m-Phenylene-diamine | Sodium acetate and acetic acid. | Deep reddish-brown |
| 1-5-dihydroxy-naphthalene | Caustic soda | Brown |
| 2-4-dihydroxy-quinoline | Caustic soda | Deep orange |

*Example 2*

11.4 parts of 2-nitro-5-amino-phenyl-thioglycollic acid was dissolved in the theoretical quantity of 10% sodium carbonate and a solution of 0.35 parts sodium nitrite added. The liquor was then added gradually to an ice cold mixture of 33 parts of hydrochloric acid (36%) and 20 parts of water. After stirring for a short time to complete diazotization, the solution was added during 30 minutes at 15° to a solution previously prepared as follows: 15 parts of 2'-3'-hydroxy-naphthoyl-p-anisidine were boiled with 25 parts methylated spirit and 47 parts of 32% caustic soda added. The whole was then diluted with water to 1500 parts.

After addition of the diazonium salt solution was complete, the reaction mixture was allowed to stir for 10 minutes before filtration. The filtered pigment was washed with water and then suspended in 500 parts of water at 60°. The suspension was made faintly alkaline by means of caustic soda and then treated with 37.5 parts of a 4N solution of sodium sulfide. After stirring for 2 hours at 60°, 100 parts of salt were added and the whole allowed to cool. The dyestuff was filtered off, washed with 100 parts of 10% salt solution, dried and ground and then washed first with 300 parts of 5% salt and finally with a little water and dried. In this way the dyestuff was obtained practically free from inorganic impurities.

Replacement of the 11.4 parts of 2-nitro-5-amino-phenyl-thioglycollic acid in the above example by one of the compounds mentioned in the following table (together with such extra amounts of water as are necessary to assist solution) gives the following results:

| Intermediate | Parts by weight | Unlactamized shade | Lactamized shade |
|---|---|---|---|
| 4-chloro-2-nitro-5-amino-phenyl-thioglycollic acid. | 13.1 | Corinth | Claret. |
| 4-methyl-2-nitro-5-amino-phenyl-thioglycollic acid. | 12.1 | Reddish-blue | Bordeaux. |
| 4-methoxy-2-nitro-5-amino-phenyl-thioglycollic acid. | 12.9 | Blue | Violet. |
| 2-nitro-4-amino-phenyl-thiolactic acid. | 12.1 | Bluish-red | Red. |
| 2-nitro-4-amino-phenoxy-acetic acid. | 10.6 | Puce | Red. |
| 2-nitro-4-amino-α-phenoxy-propionic acid. | 11.3 | Bordeaux | Red. |
| 4-choro-2-nitro-5-amino-phenyl-thioisobutyric acid. | 14.5 | Deep violet | Maroon. |

*Example 3*

Replacement of the 14.65 parts of 2-3-hydroxy-naphthoic-p-anisidide of Example 1 by 16.6 parts of 2-hydroxy-carbazole-3-carboxylic-p-anisidide gave a dyestuff which dyed wool or silk a deep chocolate brown shade. On lactamization, the dyeing undergoes a slight alteration in shade and becomes faster to washing.

*Example 4*

The chloro-2-nitro-5-amino-phenyl-thioglycollic acid mentioned in the table following Example 2 was diazotized and combined with 2'-3'-hydroxy-naphthoyl-4-bromo-o-anisidine and subsequently reduced as described in Example 1. The dyestuff when dyed on cotton or wool-cotton union material by the method of Example 8 produced a dull Bordeaux shade becoming red on lactamization. The dyed fabric was fast to washing.

*Example 5*

2 parts of a paste of the dyestuff obtained in Example 1 containing 22% of dyestuff, were dissolved in 500 parts of boiling water. 20 parts by weight of wool or silk were steeped in the boiling solution for 5–10 minutes. 1% acetic acid was then added very slowly during half an hour or more, to the hot dyebath until absorption of the color by the fiber had proceeded to its maximum. The exhaustion of the bath was good. The wool was then freed from superfluous liquor and immersed in a bath of 5% sulfuric acid at 90° C. After 10 minutes, lactamization was complete and the dyed material was thoroughly rinsed, washed and dried. A bright red resulted. The fastness to washing with warm dilute sodium carbonate was much greater after lactamization than before.

*Example 6*

0.5 parts of the dyestuff obtained as first mentioned in Example 2 were dissolved in 300 parts of water at the boil. 10 parts of wool or silk were added to the dyebath, followed by 50 parts of 1% ammonium acetate at 85° during half an hour. The material was dyed a violet color. Immersion for 30 minutes at 60–70° in a bath containing 5% of sulfuric or hydrochloric acid on the weight of textile caused lactamization, the shade changing to bordeaux. The lactamized dyeing was fast to washing and potting.

Example 7

2 parts of the dyestuff prepared according to the general method of Example 2 from 2-nitro-4-methoxy-5-amino-phenyl-thioglycollic acid and 2-3-hydroxy-naphthoic-5-chloro-o-toluidide were dissolved in 400 parts of boiling water. 15 parts of cotton or of a wool-cotton union cloth were steeped in the boiling solution for ½ to ¾ of an hour. The material was dyed a violet color. After lactamization in a bath containing 5% of hydrochloric acid at 80° for half an hour, the color became brighter and faster to washing.

Example 8

0.5 part of the dyestuff prepared as in Example 3 was dissolved in 150 parts of boiling water. 1.5 parts of 10% ammonia were added, followed by 3 parts of 10% ammonium acetate. 5 parts of cotton or of a wool-cotton union mixture were steeped in the boiling solution, for half an hour. The material, which was dyed brown, was finally treated for half an hour at 80° in a bath containing 5% of hydrochloric acid. The resulting brown dyeing was fast to washing.

It is, of course, to be understood that the examples given supra merely illustrate a few of the many compounds which come within the scope of the present invention. For instance, in place of the coupling components mentioned various other ice color coupling components might be substituted. Representative compounds falling within this class are beta-naphthol, arylamides of 2-3-hydroxy-naphthoic acid, acyl-acetic-arylamides, substituted pyrazolones, 2-4-dihydroxy-quinoline, and hydroxy-aryl-carboxylic acids in general. As previously mentioned, these components are all understood to be free from solubilizing groups such as sulfonic and carboxylic acids.

The aforementioned components are coupled with a diazotized amine having the following general formula:

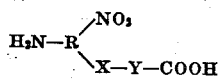

wherein R represents an aromatic nucleus free from water-solubilizing groups such as the sulfonic acid or carboxylic acid group and their alkali-metal salts; X represents —S—, —O—, or —NH—; while Y represents a methylene group of type

wherein $R_1$ and $R_2$ individually stand for hydrogen or an alkyl group; the groups $NO_2$ and X—Y—COOH being in ortho position to each other. These amines are preferably members of the benzene series, but the invention is not restricted thereto since members of the naphthalene or other aromatic series may likewise be used.

In the aforementioned examples the nitro group of the resulting azo compound was reduced with sodium sulfide, it is of course obvious that this is only one of the several well known methods of accomplishing this result. Likewise, in selecting the ortho substituted aromatic compound which is to be diazotized and coupled other well known methods may be utilized in order to permit an ortho-amino derivative capable of lactamization to be finally produced. In the above examples nitro groups were used for this purpose, but it is understood that the invention is not restricted thereto.

This invention permits insoluble dyes to be produced in substance or on animal or vegetable fibers, the latter including derived fibers such as artificial silks from regenerated cellulose or from cellulose esters or ethers. The dyes referred to herein are rendered insoluble by the formation of a six member lactam ring on the diazo component. This component prior to lactamization may be designated as

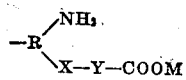

R, X and Y having the definitions given supra, and M representing an alkali-metal atom or group. After lactamization this group becomes converted into a ring of the form

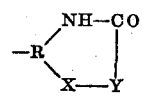

that is, into one of the following forms

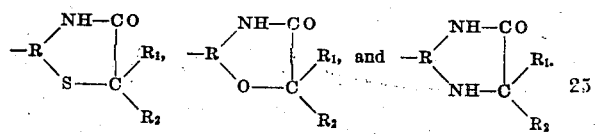

Lactamization may be accomplished according to well known methods. The method which has been found exceptionally satisfactory herein is that wherein the dye is treated with a hot dilute mineral acid, hydrochloric and sulfuric acid being in general preferred.

The new intermediates previously mentioned may be obtained as follows:

1. 2-nitro-5-amino-phenyl-thioglycollic acid by condensing together 3-chloro-4-nitro-acetanilide and thioglycollic acid in alcoholic solution in presence of alkali.
2. 4-chloro-2-nitro-5-amino-phenyl-thioglycollic acid is similarly obtained by using 2-5-dichloro-4-nitro-acetanilide in place of the above 3-chloro-4-nitro-acetanilide.
3. 2-nitro-5-amino-4-methyl-phenyl-thioglycollic acid is obtained in the same manner as the above described corresponding 5-amino-phenyl compound by using 4-chloro-5-nitro-aceto-o-toluidide (Journal of the Chemical Society 127, (1925) p. 2346).
4. 2-nitro-5-amino-4-methoxy-phenyl-thioglycollic acid is similarly obtained from 4-chloro-5-nitro-aceto-o-anisidide (G. P. 137,956. Fr. VI. 1299).
5. 4-chloro-2-nitro-5-amino-phenyl-mercapto-isobutyric acid is obtained by replacing the thioglycollic acid in No. 2 by α-mercapto-isobutyric acid (Bulmann, Ann. 348, (1906) p. 128).
6. 2-nitro-4-amino-phenyl-thiolactic acid may be obtained by condensing 2-4-dinitro-chlorobenzene in spirit solution with sodium hydrogen sulfide, condensing the resultant mercaptan with α-bromo-propionic acid and following this by partial reduction of the nitro groups with sodium sulfide.
7. 2-nitro-4-amino-α-phenoxy-propionic acid is prepared by hydrolysis of the corresponding acetyl compound by means of dilute aqueous caustic soda and the latter body results from nitration of the condensation product of p-acetyl-amino-phenol and α-bromo-propionic acid by means of strong nitric acid in presence of concentrated sulfuric acid. We do not lay claim to be the inventors of these intermediates or the above outlined processes of making them.

The present invention permits the production of dyes having satisfactory fastness properties. These dyes may readily be rendered insoluble, and in all cases are understood to be capable of lactamization. This invention is of particular value in that it embraces and renders efficacious the selection of an exceedingly wide range of diazo bases and coupling components.

As many apparently widely different embodiments of this invention may be made without departing from the spirit and scope thereof, it is to be understood that the invention is not limited to the specific embodiments thereof except as defined in the appended claims.

In the claims below, the phrase "water-solubilizing group" should be understood as embracing the sulfonic acid and carboxylic acid groups, and their alkali-metal salts. These radicals are well known for their ability to impart water-solubility to aromatic compounds, and form a natural group, well recognized in the art. Also, in view of the capacity of our novel compounds of existing in three different forms, namely free acid form, salt form, and lactam form, and in view of the ready convertibility of these three forms into one another by simple treatment with acids or alkalis, respectively, it should be understood that the phrase "having in the form of its free acid the formula (so and so)" when referring to a compound or a dyestuff, is intended as a generic expression to cover all three forms.

We claim:

1. A process for making azo dyes which comprises coupling a diazotized amine having before diazotization the following general formula:

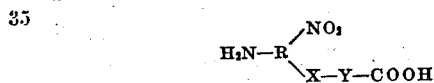

wherein R represents an aromatic nucleus free from water-solubilizing groups, X represents sulfur, oxygen, or the imine group, and Y represents a radical of the series —CH₂—, —CH(alkyl)—, and —C(alkyl)₂—, the group X—Y—COOH being located on the aromatic nucleus R in ortho position to the nitro group, with a coupling component free from water-solubilizing groups, then converting the nitro group to an amino group.

2. A process for making azo dyes which comprises coupling a diazotized amine having before diazotization the following general formula:

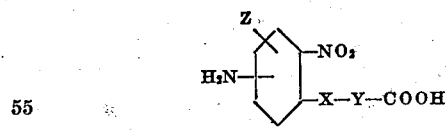

wherein Z represents hydrogen, halogen, a lower alkyl, or a lower alkoxy group, X represents sulfur, oxygen, or the imine group, and Y represents a radical of the series —CH₂—, —CH(alkyl)—, and —C(alkyl)₂— with a coupling component free from water-solubilizing groups, then converting the nitro group to an amino group.

3. A process for making azo dyes which comprises coupling a diazotized amine having before diazotization the following general formula:

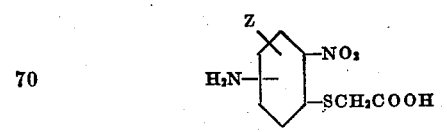

wherein Z represents hydrogen, halogen, a lower alkyl, or a lower alkoxy group, with a coupling component free from water-solubilizing groups, then converting the nitro group to an amino group.

4. A process for making azo dyes which comprises coupling a diazotized amine having before diazotization the following general formula:

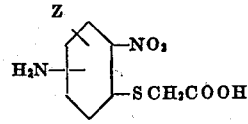

wherein Z represents hydrogen, halogen, a lower alkyl, or a lower alkoxy group, with an arylamide of 2-3-hydroxy-naphthoic acid free from water-solubilizing groups, then converting the nitro group to an amino group.

5. A process for making azo dyes which comprises coupling a diazotized amine having before diazotization the following general formula:

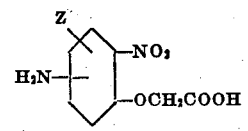

wherein Z represents hydrogen or halogen, a lower alkyl, or a lower alkoxy group, with a coupling component free from water-solubilizing groups, then converting the nitro group to an amino group.

6. A process for making azo dyes which comprises coupling a diazotized amine having the following general formula:

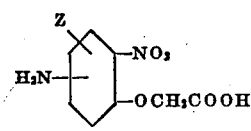

wherein Z represents hydrogen or halogen, a lower alkyl, or a lower alkoxy group, with an arylamide of 2-3-hydroxy-naphthoic acid free from water-solubilizing groups, then converting the nitro group to an amino group.

7. Azo dyes having in the form of their free acid the following general formula:

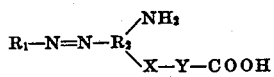

wherein $R_1$ represents the residue of a coupling component, free from water-solubilizing groups, $R_2$ represents an aromatic nucleus free from water-solubilizing groups, X represents sulfur, oxygen, or the imine group, and Y represents a radical of the series —CH₂—, —CH(alkyl)—, and —C(alkyl)₂—, the group X—Y—COOH being located on the aromatic nucleus R in ortho position to the amino group.

8. Azo dyes having in the form of their free acid the following general formula:

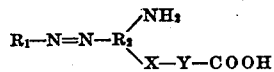

wherein $R_1$ represents the residue of an ice color coupling component, $R_2$ represents an aromatic nucleus free from water-solubilizing groups, X represents sulfur, oxygen, or the imine group, and Y represents a radical of the series —CH₂—, —CH(alkyl)—, and —C(alkyl)₂—, the group X—Y—COOH being located on the aromatic nucleus R in ortho position to the amino group.

9. Azo dyes, adapted to be rendered insoluble by treatment with dilute highly ionized mineral acids, said dyes having in the form of their free acid the following general formula:

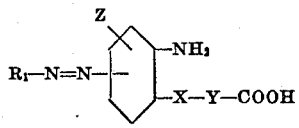

wherein $R_1$ represents the residue of an ice color coupling component, Z represents hydrogen, halogen, a lower alkyl, or a lower alkoxy group, X represents sulfur, oxygen, or the imine group, and Y represents a radical of the series —CH$_2$—, —CH(alkyl)—, and —C(alkyl)$_2$—.

10. Azo dyes, adapted to be rendered insoluble by treatment with dilute highly ionized mineral acids, said dyes having in the form of their free acid the following general formula:

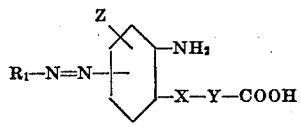

wherein $R_1$ represents the residue of an arylamide of 2-3-hydroxynaphthoic acid free from water-solubilizing groups, Z represents hydrogen, halogen, a lower alkyl, or a lower alkoxy group, X represents sulfur, oxygen, or the imine group, and Y represents a radical of the series —CH$_2$—, —CH(alkyl)—, and —C(alkyl)$_2$—.

11. Azo dyes, adapted to be rendered insoluble by treatment with dilute highly ionized mineral acids, said dyes having in the form of their free acid the following general formula:

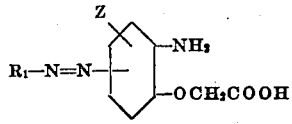

wherein $R_1$ represents the residue of an arylamide of 2-3-hydroxynaphthoic acid free from water-solubilizing groups, and Z represents hydrogen, halogen, a lower alkyl, or a lower alkoxy group.

12. Azo dyes, rendered insoluble by treatment with dilute mineral acids, having in the form of their free acid the following general formula:

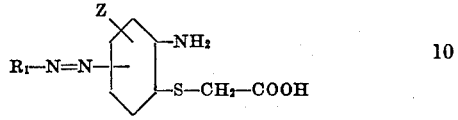

wherein $R_1$ represents the residue of an arylamide of 2-3-hydroxynaphthoic acid free from water-solubilizing groups, and Z represents hydrogen, halogen, a lower alkyl, or a lower alkoxy group.

13. A process for dyeing textile material which comprises applying thereto an aqueous solution of an azo dyestuff of the general formula as defined by claim 12, and treating the fiber further with dilute mineral acid whereby to lactamize the dyestuff on the fiber and convert it into a water-insoluble form.

14. A process of dyeing textile material which comprises applying thereto an aqueous solution of an azo dyestuff of the general formula as defined by claim 8, and treating the fiber further with dilute mineral acid whereby to lactamize the dyestuff on the fiber and convert it into a water-insoluble form.

15. Textile fibers when dyed with the lactam of a dyestuff as defined in claim 8.

16. Textile fibers when dyed with the lactam of a dyestuff as defined in claim 12.

SAMUEL COFFEY.
MORVAN LAPWORTH.
WILFRED ARCHIBALD SEXTON.